United States Patent
Zhu et al.

(10) Patent No.: US 8,185,105 B2
(45) Date of Patent: May 22, 2012

(54) METHOD, SYSTEM AND APPARATUS FOR USING IMS COMMUNICATION SERVICE IDENTIFIER

(75) Inventors: Dongming Zhu, Shenzhen (CN); Xiaoyan He, Shenzhen (CN); Shuang Liang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 477 days.

(21) Appl. No.: 12/539,890

(22) Filed: Aug. 12, 2009

(65) Prior Publication Data

US 2009/0298495 A1 Dec. 3, 2009

Related U.S. Application Data

(63) Continuation of application No. PCT/CN2007/071090, filed on Nov. 19, 2007.

(30) Foreign Application Priority Data

Feb. 13, 2007 (CN) .......................... 2007 1 0079246

(51) Int. Cl.
- *H04W 4/00* (2009.01)
- *H04M 3/42* (2006.01)
- *G06F 15/173* (2006.01)
- *G06F 15/16* (2006.01)
- *H04L 12/66* (2006.01)

(52) U.S. Cl. ........ 455/433; 709/227; 709/226; 709/225; 455/414.1; 370/352

(58) Field of Classification Search .................. 455/433; 370/352
See application file for complete search history.

(56) References Cited

U.S. PATENT DOCUMENTS

| | | | |
|---|---|---|---|
| 2005/0002381 A1 | 1/2005 | Westman et al. | |
| 2006/0077932 A1* | 4/2006 | Takeda et al. | 370/331 |
| 2008/0189414 A1* | 8/2008 | Astrom et al. | 709/225 |
| 2009/0144429 A1 | 6/2009 | Astrom | |
| 2009/0227236 A1* | 9/2009 | Sanchez Herrero et al. | 455/414.1 |
| 2010/0020790 A1* | 1/2010 | Pallares Lopez et al. | 370/352 |

FOREIGN PATENT DOCUMENTS

| CN | 1534930 A | 10/2004 |
|---|---|---|
| WO | WO 2006/016846 A1 | 2/2006 |
| WO | WO2006125471 A1 | 11/2006 |

OTHER PUBLICATIONS

International Search Report from P.R. China in International Application No. PCT/CN2007/071090 mailed Feb. 14, 2008.

(Continued)

*Primary Examiner* — Dwayne Bost
*Assistant Examiner* — Timothy Pham
(74) *Attorney, Agent, or Firm* — Finnegan, Henderson, Farabow, Garrett & Dunner LLP

(57) ABSTRACT

A method, system and apparatus for using an IMS communication service identifier is provided. The method includes getting, by an HSS, arrival of information related to a user subscribed IMS communication service identifier, and sending information of a user subscribed IMS communication service identifier to a SID-requiring network entity according to the information related to the user subscribed IMS communication service.

4 Claims, 6 Drawing Sheets

OTHER PUBLICATIONS

3GPP TS 29.228 V7.4.0, 3rd Generation Partnership Project; Technical Specification Group Core Network and Terminals; IP Multimedia (IM) Subsystem Cx and Dx interfaces; Signalling flows and message contents (Release 7), pp. 1-59, (Dec. 2006).

3GPP Ts 23.228 V7.6.0, 3rd Generation Partnership Project; Technical Specification Group Services and System Aspects; IP Multimedia Subsystem (IMS); Stage 2 (Release 7), pp. 1-215, (Dec. 2006).

Qiang, "Research of the Application of Diameter Protocol in 3G", Telecom Engineering Technics and Standardization, pp. 16-20, (Apr. 2006).

Second Chinese Office Action of Chinese Application No. 200780000599.7, mailing date of Mar. 30, 2011 (2 pgs.).

Third Chinese Office Action of Chinese Application No. 200710079246.2, mailing date of Aug. 25, 2011, (7 pgs.).

Rejection Decision dated (mailed) Jan. 6. 2012, issued in related Chinese Application No. 200780000599.7 Huawei Technologies Co., LTD.

Chinese Office Action dated May 8, 2009, issued in related Chinese Application No. 2007100792462, filed Feb. 13, 2007.

Global System for Mobile Communications, "3rd Generation Partnership Project; Technical Specification Group Core Network and Terminals; IP Multimedia (IM) Subsystem Sh interface; Signalling flows and message contents (Release 7)." 3GPP TS 29.328 V7.4.0 (Dec. 2006) Technical Specification, pp. 1-41.

3GPP TS 29.228 "Technical Specification Group Core Network and Terminals; IP Multimedia (IM) Subsystem Cx and Dx interfaces; Signalling flows and message contents (Release 7)" V7.4.0, Dec. 2006.

3GPP TS 23.008 "Technical Specification Group Core Network and Terminals; Organization of subscriber data (Release 7)" V7.4.0 Dec. 2006.

Russian Office Action dated (mailed) Oct. 22, 2010, issued in related Russian Application No. 2009134133 Huawei Technologies Co., LTD.

Second Chinese Office Action dated (mailed) Nov. 6, 2009, issued in related Chinese Application No. 200710079246.2 Huawei Technologies Co., LTD.

3GPP TS 23.008, "3rd Generation Partnership Project; Technical Specification Group Core Network and Terminals; Organization of subscriber data (Release 7)," V7.4.0 (2006-12), GSM® Global System for Mobile Communications, http://www.3gpp.org, *3GPP Organizational Partners* (2006), 72 pages.

3GPP TS 23.228, "3rd Generation Partnership Project; Technical Specification Group Services and System Aspects; IP Multimedia Subsystem (IMS); Stage 2 (Release 7)," V7.6.0 (Dec. 2006), http://www.3gpp.org, *3GPP Organizational Partners* (2006), 215 pages.

3GPP TS 29.328, "3rd Generation Partnership Project; Technical Specification Group Core Network and Terminals; IP Multimedia (IM) Subsystem Sh interface; Signalling flows and message contents (Release 7)," V7.4.0 (Dec. 2006), GSM® Global System for Mobile Communications, http://www.3gpp.org, *3GPP Organizational Partners* (2006), 41 pages.

English translation of Written Opinion of the International Searching Authority, issued by The State Intellectual Property Office, P.R. China, mailed Feb. 14, 2008, in the PCT/CN2007/071090, 7 pages.

ETSI TS 123 008, "Digital cellular telecommunications system (Phase 2+); Universal Mobile Telecommunications System (UMTS); Organization of subscriber data (3GPP TS 23.008 version 7.4.0 (Release 7)," V7.4.0 (Dec. 2006), GSM® Global System for Mobile Communications, http://www.etsi.org, *European Telecommunications Standards Institute* (2006), 74 pages.

European Search Report, dated Jun. 11, 2008, in Appl. No. 08101535.6, 9 pages.

First Chinese Office Action for Chinese Appl. No. 20078000599.7, mailed Jun. 7, 2010, and its partial English translation, 18 pages.

\* cited by examiner

METHOD, SYSTEM AND APPARATUS FOR USING IMS COMMUNICATION SERVICE IDENTIFIER

CROSS-REFERENCE TO RELATED APPLICATION

This application is a continuation of PCT Application No. PCT/CN2007/071090, filed on Nov. 19, 2007, which claims priority to Chinese Patent Application No. 200710079246.2, filed with the Chinese Patent Office on Feb. 13, 2006, the entire contents of all of which are incorporated herein by reference.

TECHNICAL FIELD

The disclosed embodiments relate to the communication field and in particular to a method, system and apparatus for using IMS communication service identifiers in a communication system.

BACKGROUND

In an existing IP Multimedia Subsystem (IMS) architecture of the 3$^{rd}$ Generation Partnership Project (3GPP), most application services may be provided by an Application Server (AS). Provision of an application service for a user session may be performed using a type of AS and may be determined dependent upon an initial Filter Criteria (iFC) in a user service profile.

In the related art, a Cx interface is set between a Serving Call Session Control Function (S-CSCF) and a Home Subscriber Server (HSS).

The concept of IMS communication Service Identifier (SID) in an IMS domain, defines application demands and a basic architecture for the SID. An important factor for using the SID is to identify each separate service.

In the related art, a network entity that uses the IMS communication service identifier cannot acquire any IMS communication service identifier and further cannot perform corresponding operations dependent upon the IMS communication service identifier.

SUMMARY

Disclosed embodiments provide a method, system and apparatus for using an IP Multimedia Subsystem (IMS) communication service identifier so that a network entity that uses the IMS communication service identifier can acquire the IMS communication service identifier from a Home Subscriber Service (HSS).

A method according to an embodiment is provided. The method may include the steps of: getting, by a home location register home subscriber service (HSS), arrival of information related to a user subscribed IMS communication service identifier; and, sending, by the HSS, information of a user subscribed IMS communication service identifier to a Service Identifier (SID)-requiring network entity according to the information related to the user subscribed IMS communication service identifier.

A system according to an embodiment is provided. The system may include: a home location register Home Subscriber Service (HSS), configured to get arrival of information related to a user subscribed IMS communication service identifier and to send information of the user subscribed IMS communication service identifier to a network entity that uses the IMS communication service identifier according to the information related to the user subscribed IMS communication service identifier; and, the network entity that uses the IMS communication service identifier is configured to receive the information of the IMS communication service identifier sent from the HSS.

A home location register according to an embodiment is provided. The home location register may include: a storage module configured to store information of a user subscribed IMS communication service identifier; a getting module configured to get whether information related to the user subscribed IMS communication service identifier arrives; and, a sending module configured to send information of the user subscribed IMS communication service identifier stored in the storage module to a Service Identifier (SID)-requiring network entity when the getting module determines the arrival of the information related to the user subscribed IMS communication service identifier.

An application server according to an embodiment is provided. The application server may include: an application checking module configured to determine whether an inquiry or subscription directed to a Home Subscriber Service (HSS) is required for a provided service; a request sending module configured to send to the HSS a message requesting for an inquiry about or subscription to information of an IMS communication service identifier when the application checking module determines that the inquiry or subscription directed to the HSS is required; and, a receiving module configured to receive the information of the IMS communication service identifier sent from a network side.

A serving call session control function entity according to an embodiment is provided. The serving call session control function may include: a receiving module configured to receive information of an IP Multimedia Subsystem (IMS) communication service identifier sent from a network side; a storage module configured to store the information of the IMS communication service identifier; and, an updating module configured to update data stored by the storage module using the information of the IMS communication service identifier received by the receiving module.

Consistent with the disclosed embodiments, the HSS sends the information of the user subscribed IMS communication service identifier to the network entity that uses the IMS communication service identifier upon getting arrival of the information of the user subscribed IMS communication service identifier, so that the network entity that uses the IMS communication service identifier can acquire the IMS communication service identifier.

DETAILED DESCRIPTION

Figure 1:
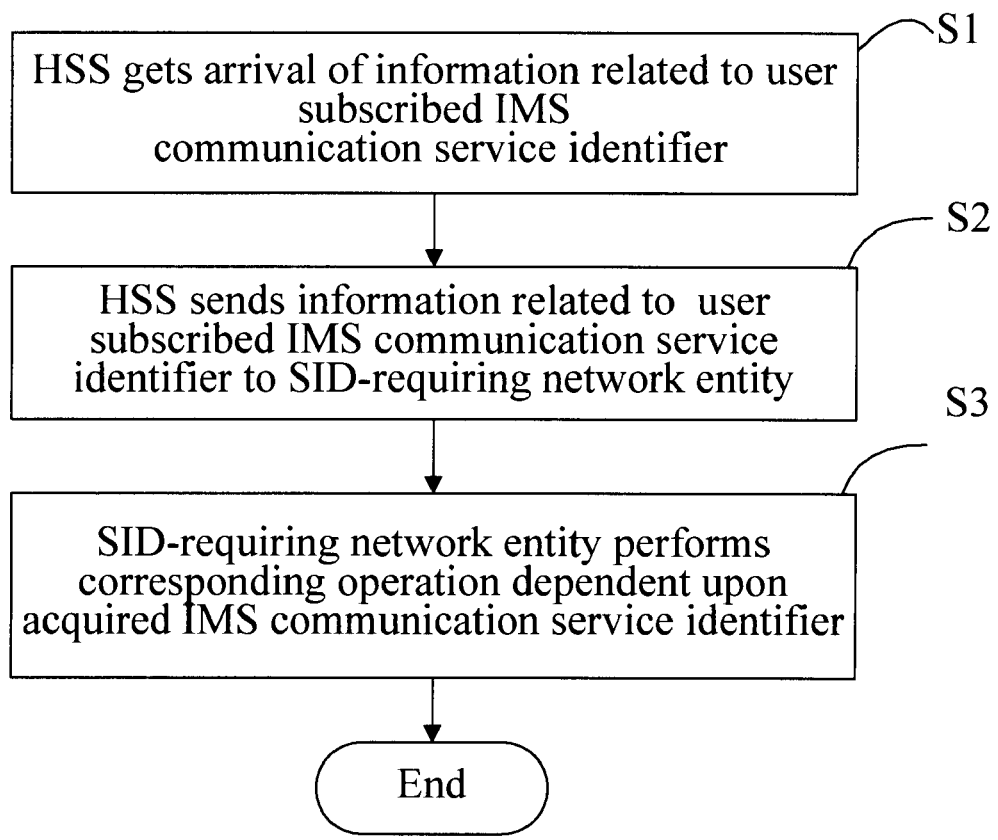
FIG. 1 is a flow chart of the method consistent with some embodiments.

Each separate IMS communication service can be identified after introduction of the SID, as the SID in current standards is part of an iFC, and the iFC is primarily intended for triggering implementation of a certain application in an AS but not for checking subscription for a service. Consequently, the prior art approach can satisfy neither a demand of an S-CSCF for checking a subscribed service nor a demand of an AS for an inquiry and subscription of a subscribed service The disclosed embodiments provide a method for using an IMS communication service identifier in a communication system so that a network entity that uses the IMS communication service identifier can acquire the IMS communication service identifier. In the embodiments, the network entity which that uses the IMS communication service identifier may also be called as a SID-requiring network entity. The method as illustrated in FIG. 1 may include the following processes.

In block S1: An HSS gets arrival of information related to a user subscribed IMS communication service identifier.

The following scenarios may exist dependent upon different network entities that use the IMS communication service identifier and upon different times at which information related to the user subscribed IMS communication service identifiers arrive.

In the first scenario, an S-CSCF is the SID-requiring network entity and sends to the HSS a message requesting for downloading a user service profile. The HSS determines the arrival of the information upon reception of the message requesting for downloading the user service profile.

In the second scenario, an S-CSCF is the SID-requiring network entity. The HSS determines arrival of the information upon change of the information of the user subscribed IMS communication service identifier. The IMS communication service identifier is stored in the HSS. The arrival of the information may refer to the arrival of a time to send the IMS communication service identifier.

In the third scenario, an AS is the SID-requiring network entity. The AS determines whether to send a message requesting for an inquiry to the HSS according to provided services. For instance, an application provided by the AS may use one or more IMS communication service(s), the AS inquires of the HSS about whether the user has subscribed to the service(s). The AS inquires of the HSS to obtain a list of the user subscribed IMS communication service identifier. Alternatively, the AS may send the message requesting for the inquiry to the HSS directly. The HSS determines the arrival of the information upon reception of the message requesting for the inquiry.

In the fourth scenario, the AS is the SID-requiring network entity. The HSS determines the arrival of the information upon change of the information of the user subscribed IMS communication service identifier. The IMS communication service identifier is stored in the HSS. The arrival of the information may refer to the arrival of a time to send the IMS communication service identifier.

In block S2: The HSS sends the information of the user subscribed IMS communication service identifier to the SID-requiring network entity.

Figure 2:
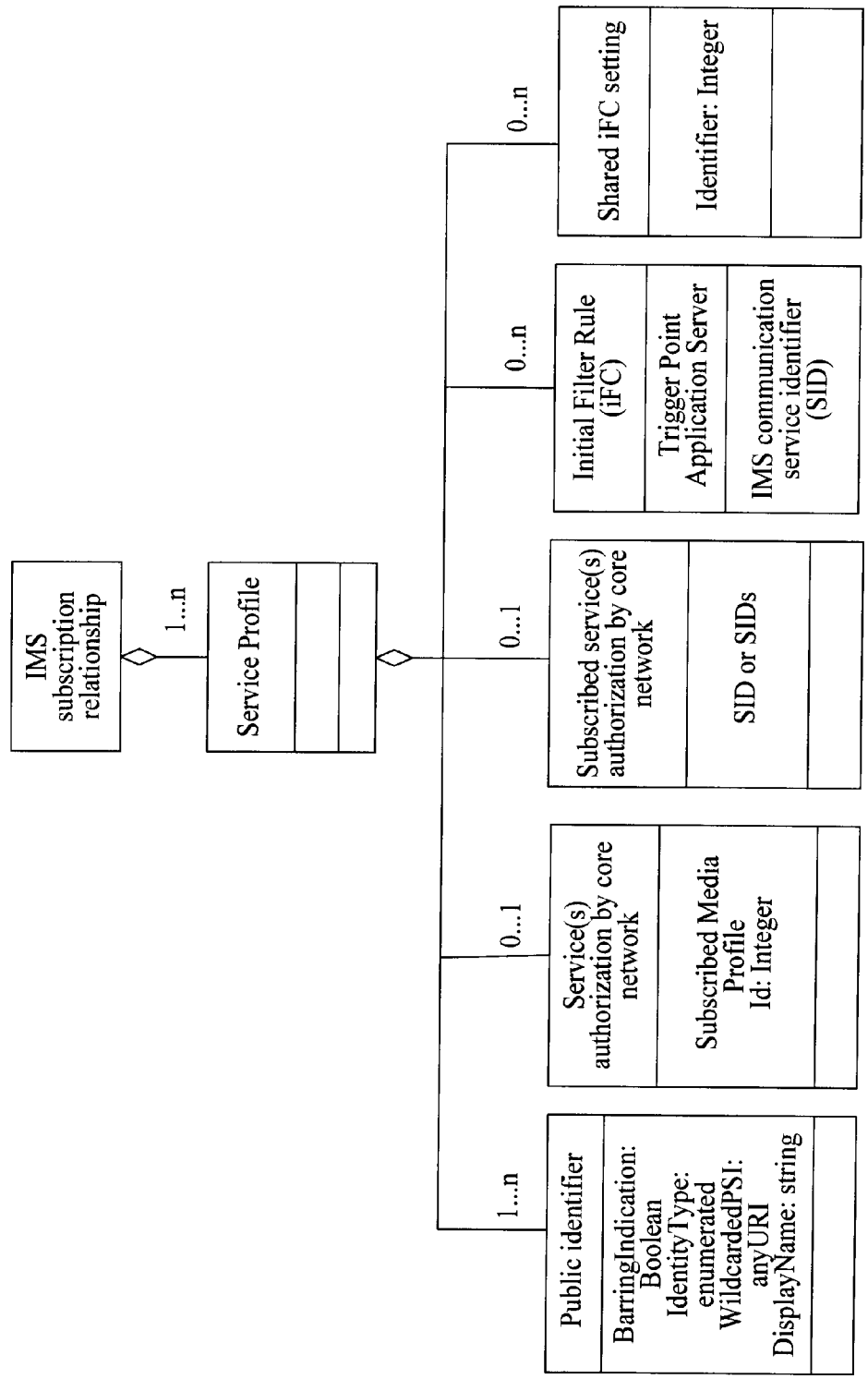
FIG. 2 shows an implementing mode of storing an IMS communication service identifier in user service profile information consistent with some embodiments.
Figure 3:
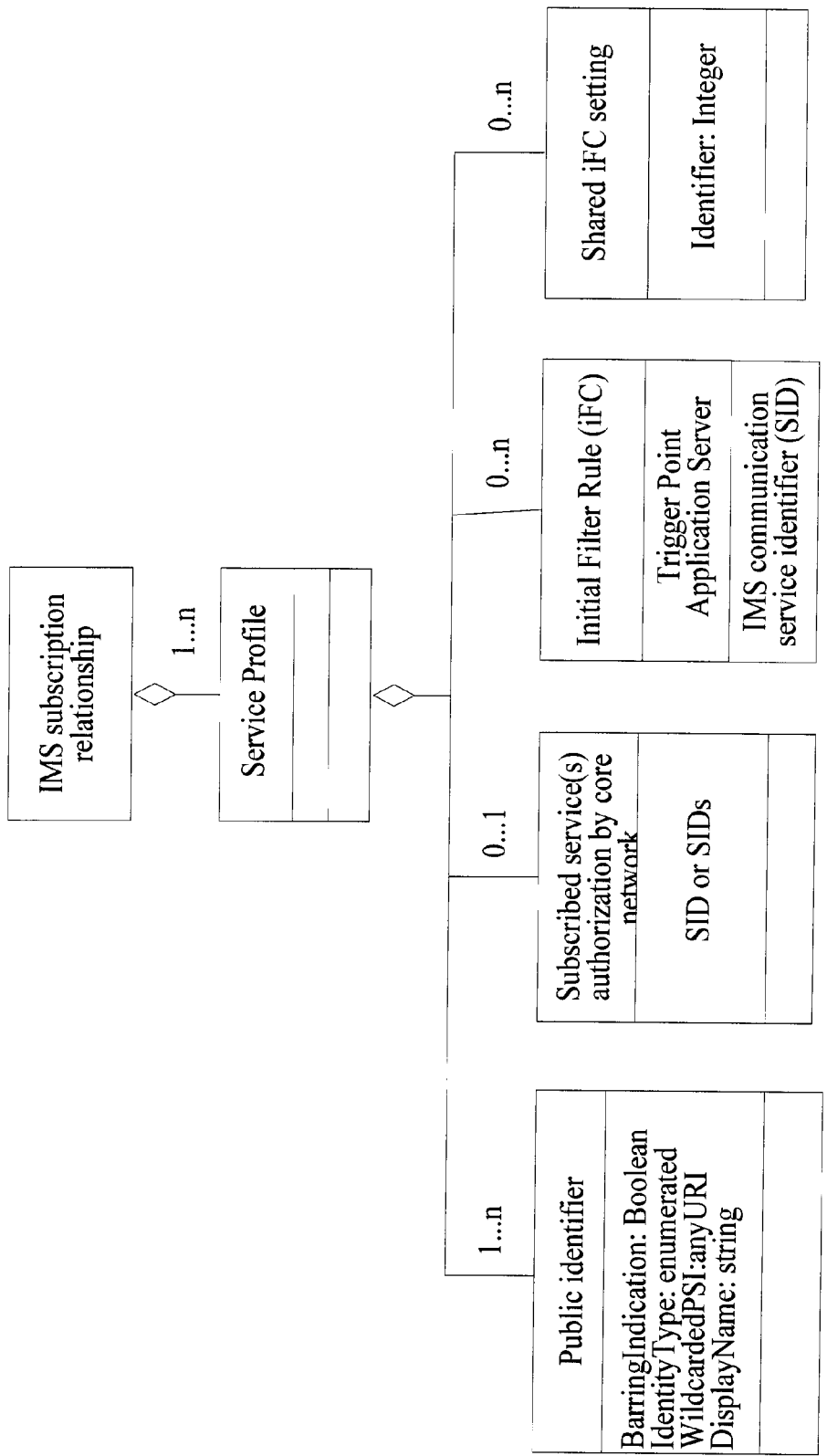
FIG. 3 shows an implementing mode of storing an IMS communication service identifiers in user service profile information consistent with some embodiments.

An IMS communication service identifier may be used in the HSS as follows: the IMS communication service identifier is used to specify a condition for triggering the AS in an iFC, and to specify which specific application of the AS may be performed; the IMS communication service identifier may be used to indicate authorization for a subscribed service of a core network, and may correspond to an IMS Public User Identifier (IMPU) or IMPUs in the user service profile information and is indicative of a subscribed IMS communication service. The IMPU(s) may be a SIP URI or a Tel URI. If the IMS communication service identifier is used to indicate authorization for a subscribed service of a core network, storage of the IMS communication service identifier in the user service profile information may be implemented in the following two ways: as illustrated in FIG. 2, a data module is added newly in the user service profile information stored in the HSS to store the information of the user subscribed IMS communication service identifier; or as illustrated in FIG. 3, media subscription information stored in the user service profile information stored in the HSS may be replaced by the information of the user subscribed IMS communication service identifier.

For the HSS sending the information of the user subscribed IMS communication service identifier to the SID-requiring network entity in accordance with the first scenario, the HSS carries the information of the user subscribed IMS communication service identifier in a response message, and sends the response message to the S-CSCF.

In accordance with the second scenario, the HSS sends the updated information of the user subscribed IMS communication service identifier to the S-CSCF that uses the IMS communication service identifier, and the S-CSCF provides the services for the user.

In accordance with the third scenario, the HSS carries the information of the user subscribed IMS communication service identifier in a response message, and sends the response message to the AS.

In accordance with the fourth scenario, the HSS sends the updated information of the user subscribed IMS communication service identifier to the AS having subscription relation with a changed IMS communication service identifier. During establishment of the subscription relation, the AS may determine whether to send a message requesting for the subscription to the HSS according to the requirement of application providing. The AS sends the message requesting for subscription to the HSS to establish the subscription relation when there is a need of subscribing to the IMS communication service identifier. For instance, a change in the list of the user subscribed IMS communication service identifier may cause the subscription to be changed from supporting provision of the application to not supporting provision of the application. Therefore the AS subscribes to the change of the services from the HSS by sending a request for subscribing to the list of the identifiers of IMS communication services to the HSS.

The method may also include the following process.

In block S3: The SID-requiring network entity performs corresponding operations dependent upon the acquired IMS communication service identifier.

In accordance with the first and second scenarios, as obtaining the information of the user subscribed IMS communication service identifier, the S-CSCF performs an IMS communication service authorization check for a session during set-up of the session. The S-CSCF may match the information of the user subscribed IMS communication service identifier obtained from the HSS with the information of the IMS communication service identifier carried in a session set-up request. If the information of the IMS communication service identifier carried in the session set-up request exists in the information of the user subscribed IMS communication service identifier obtained from the HSS, it is considered that the IMS communication service authorization check is passed, otherwise a failure response is returned. There may be a particular situation in which the IMS communication service identifier information carried in the session set-up request is null, then it may be considered that the IMS communication service authorization check is passed.

In accordance with the third and fourth scenarios, the AS obtains the information of the user subscribed IMS communication service identifier, and the AS performs a logic process. In some cases, the logic process may include a check of an association relation between the application and the user subscribed IMS communication service.

Detailed descriptions may be presented below in embodiments as follows.

Figure 4:
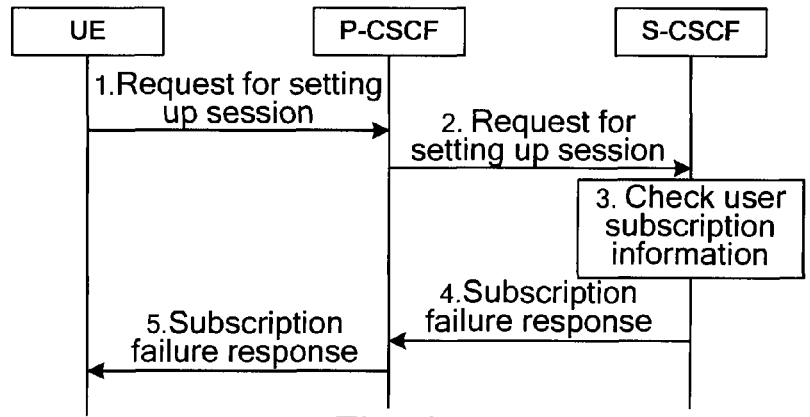
FIG. 4 is a signaling flow chart consistent with some embodiments.

In an embodiment, the S-CSCF is the network entity that uses the IMS communication service identifier. After successful user registration, the S-CSCF sends a message to request downloading the user profile information to the HSS via the Cx interface. The HSS returns, in a response message, the user profile information including the list of the identifiers of user subscribed IMS communication services. After the user registration has been finished, upon change of the user profile information the HSS may be sent a informing message to the S-CSCF serving the user to inform the change of the user profile information via the Cx interface, and the updated user profile information may be carried in the informing message. In some cases, the updated user profile information may include the list of the identifiers of user subscribed IMS communication services. When receiving the user profile information, the S-CSCF may store locally the profile including the list of the identifiers of user subscribed IMS communication services, and perform an IMS communication service authorization check for set-up session dependent upon the IMS communication service identifier. The set-up session may include a session set up with a calling UE (User Equipment) or a session set up with a called UE. This embodiment takes a calling UE as an example. The situation of a called UE may be similar. The S-CSCF serving the called UE may perform the authorization check. With reference to FIG. 4, the embodiment includes the following processes.

In processes 1-2, a session request is initiated by a UE, and the session request is routed to the S-CSCF through a Proxy Call Session Control Function (P-CSCF).

In process 3, the S-CSCF checks whether the user subscribes to a corresponding IMS communication service. If the user subscribes to a corresponding IMS communication service, the calling set-up is continued, and processes 4-5 may be skipped; otherwise, the subsequent processes are carried out.

In processes 4-5, the S-CSCF returns to the UE a prohibition response through the P-CSCF. The prohibition response indicates a refusal reason that the user does not subscribe to the service.

Figure 5:
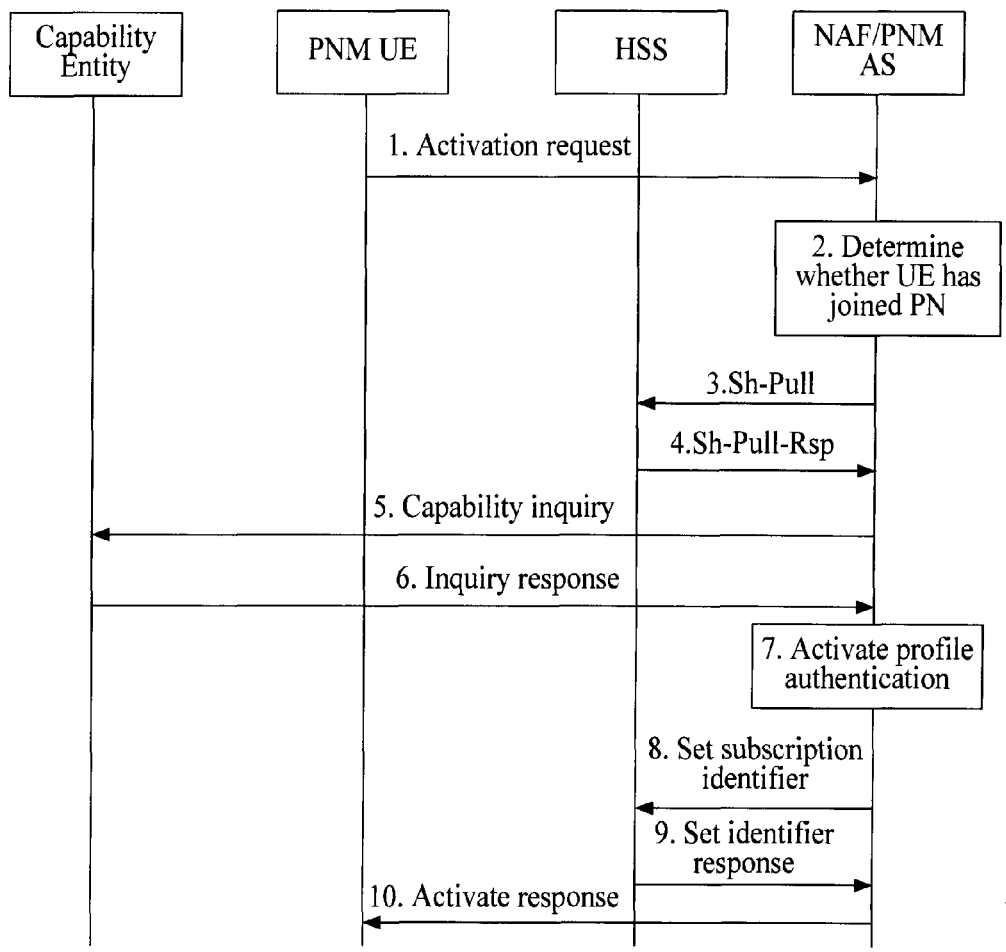
FIG. 5 is a signaling flow chart consistent with some embodiments.

In an embodiment, the IMS communication service identifier is used in a flow of activating a Personal Network Management (PNM) service. The embodiment as illustrated in FIG. 5 includes:

In the process 1, a PNM UE sends an activation request to a Network Application Entity (NAF) via a Ut interface. The activation request may carry one or more information as follow: an IMPU, an activated type, a service code and a priority parameter.

In the process 2, the NAF authenticates an identity of the PNM UE. When the authentication has been passed, an IP Multimedia Private Identifier (IMPI) of the PNM UE is added in the request message. The request message may be forwarded to a PNM AS. The PNM AS checks whether IMPI-IMPU-PNID has been recorded locally in the PNM AS to determine whether the PNM UE has been registered with the PN (Personal Network).

In process 3, the PNM AS inquires an HSS to obtain information of all IMS communication services subscribed for the IMPU to be activated. It is implemented through an sh-Pull message in this embodiment.

It should be noted that the AS capable of inquiring the HSS may be an AS with a privilege so as to protect the safety of user information. An sh-Pull-Rep message may be used in this embodiment.

In process 4, the HSS returns in a response all the IMS communication services subscribed for the IMPU, the IMS communication services may be indicated by a list of IMS communication service identifiers (SID). The PNM AS compares the IMS communication service identifier carried in the activation request with the SID list downloaded from the HSS, and saves an intersection set of the both as services that can be activated. If there is no such an intersection set, an activation failure response may be returned. An sh-Pull-Rep message may be used.

In processed 5-6, the PNM AS obtains capability information of the activated UE1 from an entity for storing the information capability of a UE.

In process 7, the PNM AS compares the capability information of the activated PNM UE with a capability required for a service to be activated. If a service requirement can be satisfied, the service is considered to be activated successfully by the PNM UE with the IMPU. The PNM AS saves the service activation setting information, and also possibly overwrites a previous activation profile if necessary. A successful activation record may include IMPI-IMPU-PNID, an activation type, a SID, a media component, and priority parameters, and the media component or the priority parameters may be null.

In process 8, the PNM AS sets in the HSS a subscription identifier of the subscription information associated with the IMPU, which subscription identifier carries an address of the PNM server. When the list of the SID(s) subscribed for the IMPU changes, the HSS may inform the PNM AS, and the PNM AS determines whether to modify the activation information.

It should be noted that the AS capable of subscribing to the change of the information of all associated IMS communication services subscribed for the IMPU may be an AS having a privilege, so as to protect the safety of the user information.

In process 9, the HSS returns to the PNM AS a response to setting of the subscription identifier.

In process 10, the PNM AS returns to the PNM UE an activation response indicating whether the present activation operation succeeds. In this embodiment, it is allowable to activate successfully part of services in the activation request. Therefore, an activation response message may carry the IMS communication service identifiers and the IMPUs of the services activated with success.

Figure 6:
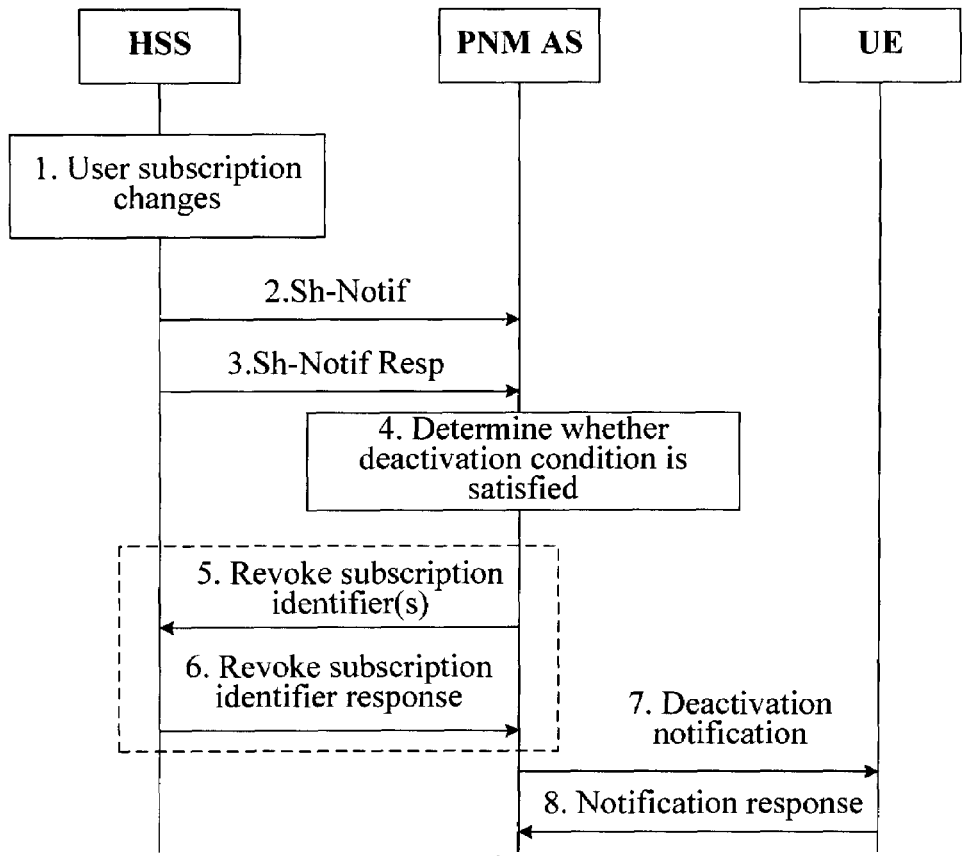
FIG. 6 is a signaling flow chart consistent with some embodiments.

The embodiment as follow involves a deactivation operation of the PNM AS due to the change of the list of IMS communication service identifiers. The embodiment as illustrated in FIG. 6 includes the following processes.

In process 1, a user subscribed IMS communication service changes, for example, the SID list changes.

In process 2, the HSS informs the PNM AS. The PNM AS has performed a subscription operation dependent upon previous subscription. The process may be implemented by an sh-Notif message.

In process 3, the PNM AS returns a response to the HSS upon reception of the notification. The process may be implemented by an sh-Notif Resp message.

In process 4, the PNM AS determines whether to perform the deactivation operation according to the change of the SID. The PNM AS may delete an activation record.

In processes 5-6, if all activation records associated with an IMPU are deleted, the PNM AS may revoke both a registration status associated with the IMPU and the subscription to the list of subscribed IMS communication services. When receiving the revoke of the PNM AS, the HSS deletes the subscription identifier and returns a response message. If there is any activation record regarding the IMPU remaining in the PNUM AS, the processes 5-6 may be skipped.

In processes 7-8, the user is notified that the deactivation operation is initiated by the network, and returns a response indicating reception of the notification.

It should be noted that any mechanism, including but not limited to OMA Push or MESSAGE in the SIP, can be used to perform the notification.

Figure 7:
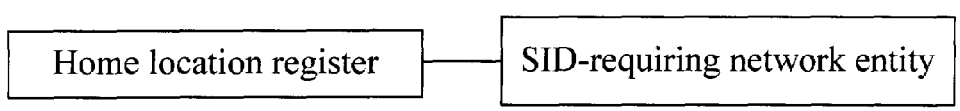
FIG. 7 is a schematic diagram of a system consistent with some embodiments.

The embodiments may also provide a system for using an IMS communication service identifier in a communication system as illustrated in FIG. 7. The system may include a home location register HSS and a SID required network entity connected to the HSS, the SID required network entity that uses the IMS communication service identifier.

The HSS is configured to sense the arrival of the information related to the identifiers of user subscribed IMS communication services, and send the locally stored information of the user subscribed IMS communication service identifier to the SID-requiring network entity.

The SID-requiring network entity is configured to receive the information of the IMS communication service identifier sent from the HSS.

Further, the SID-requiring network entity is an S-CSCF, and a Cx interface is set between the S-CSCF and the HSS. The following two scenarios may be present dependent upon the different times at which the information related to the user subscribed IMS communication service identifier arrives.

The S-CSCF sends a message requesting for downloading a user service profile to the HSS via the Cx interface. Upon reception of the message requesting for downloading the user service profile, the HSS determines the arrival of the information, sends a response message of the message requesting for downloading the user service profile to the S-CSCF, wherein the information of the user subscribed IMS communication service identifier is contained in the response message.

The HSS determines the arrival of the information (which may refers to arrival of a time to send the IMS communication service identifier) when the information of the identifiers of the user subscribed IMS communication services changes, and sends the updated information of the user subscribed IMS communication service identifier to the S-CSCF that uses the IMS communication service identifier.

The S-CSCF that uses the IMS communication service identifier is further configured to perform an IMS communication service authorization check for a newly set-up session by using the acquired information of the user subscribed IMS communication service identifier.

Further, the SID-requiring network entity is an AS, and an Sh interface is set between the AS and the HSS. The following two scenarios may be present dependent upon different times at which the information related to the user subscribed IMS communication service identifier arrives.

The AS sends to the HSS via the Sh interface a message requesting for an inquiry. The AS may firstly check a demand of a provided service and determine whether to send a message requesting for the inquiry to the HSS dependent upon the result of the check. For instance, if one or more IMS communication services is used by the application provided by the AS, the AS may inquire of the HSS about whether the user has subscribed to the services through inquiring of the HSS about a list of identifiers of user subscribed IMS communication services. There are possibly other situations in which the message requesting for the inquiry may be sent to the HSS. The HSS determines arrival of the information upon reception of the message requesting for the inquiry, carries in a response message the locally stored information of the user subscribed IMS communication service identifier and sends the response message to the AS.

The HSS determines the arrival of the information, which arrival refers to the arrival of a time to send the IMS communication service identifier, when the locally stored information of the user subscribed IMS communication service identifier changes, and sends the updated information of the user subscribed IMS communication service identifier to the AS having a subscription relation with the a changed IMS communication service identifier. During establishment of the subscription relation, the AS may firstly check the demand of the provided service and determine whether to send a message requesting for subscription to the HSS dependent upon the result of the check. For instance, a change of the list of identifiers of user subscribed IMS communication services may cause the subscription to be changed from supporting provision of the application to not supporting provision of the application. Therefore, the AS may subscribe to the change of the services from the HSS by sending to the HSS a request for subscribing to the list of identifiers of IMS communication services. There may exist other situations in which a message requesting for subscription may be sent to the HSS.

The network entity AS that uses the IMS communication service identifier may be further configured to perform an application logic process by using the acquired information of the user subscribed IMS communication service identifier.

Figure 8:
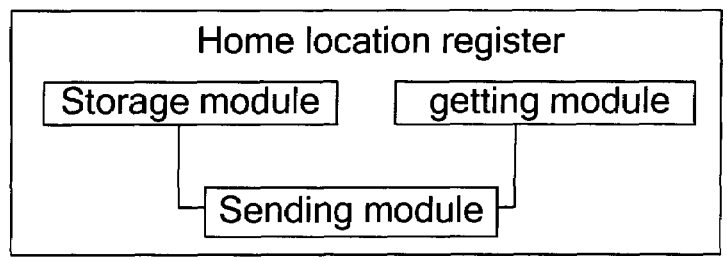
FIG. 8 is a schematic diagram of a home location register consistent with some embodiments.

The disclosed embodiments may further provide a home location register including a storage module, a sensing module and a sending module coupled with the storage module and the sensing module, as illustrated in FIG. 8.

The storage module is configured to store the information of identifiers of user subscribed IMS communication services. The storage module may store both the information of the user subscribed IMS communication service identifier and media subscription information, or store only the information of the user subscribed IMS communication service identifier.

The sensing module is configured to sense whether the information related to identifiers of user subscribed IMS communication services arrives.

The sending module is configured to send the information of the user subscribed IMS communication service identifier stored in the storage module to a SID-requiring network entity, when the sensing module determines arrival of the information.

Figure 9:
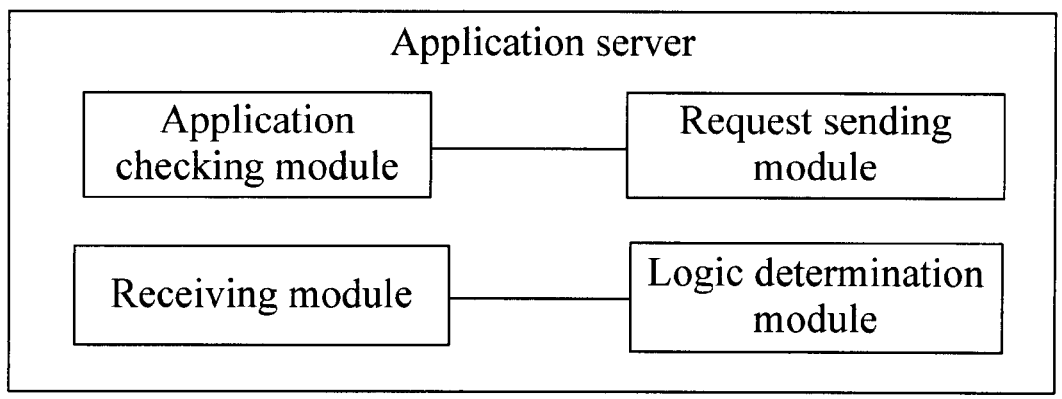
FIG. 9 is a schematic diagram of an application server consistent with some embodiments.

The disclosed embodiments may further provide an application server including an application checking module, a request sending module coupled with the application checking module, a receiving module, and a logic determining module coupled with the receiving module, as illustrated in FIG. 9.

The application checking module is configured to determine whether a provided application needs to make an inquiry or subscription directed to an HSS.

The request sending module is configured to send to the HSS a message requesting for an inquiry about or subscription to information of IMS communication service identifier when the application checking module determines that the inquiry or subscription to the HSS is needed.

The receiving module is configured to receive the information of the IMS communication service identifier sent from a network side.

The logic determining module is configured to determine an association relationship between the provided application and the information of the IMS communication service identifier dependent upon the information of the IMS communication service identifier received by the receiving module.

Figure 10:
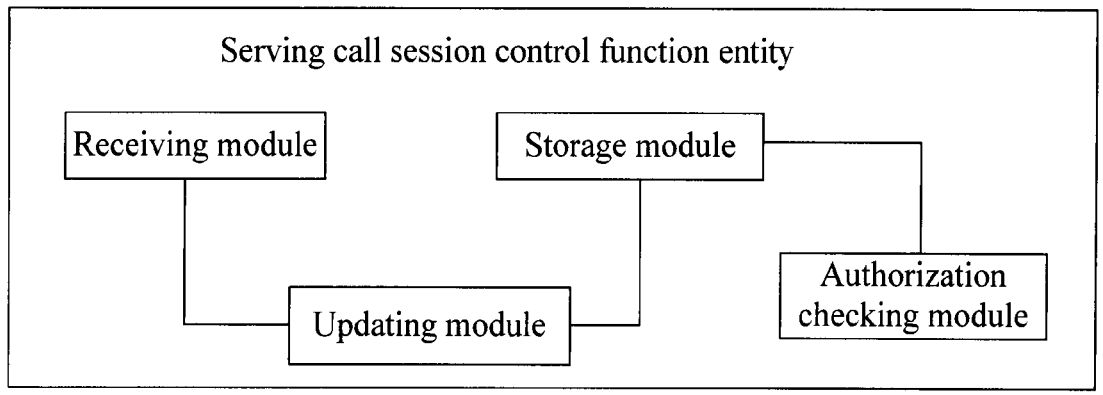
FIG. 10 is a schematic diagram of a service call session control function entity consistent with some embodiments.

The disclosed embodiments may further provide a Serving Call Session Control Function entity including a receiving module, a storage module, an updating module respectively coupled with the receiving module and the storage module, and an authorization checking module coupled with the storage module, as illustrated in FIG. 10.

The receiving module is configured to receive information of an IMS communication service identifier sent from a network side.

The storage module is configured to store the information of the IMS communication service identifier.

The updating module is configured to update data stored by the storage module by using the information of the IMS communication service identifier received by the receiving module.

The authorization checking module is configured to perform, during set-up of a session, an IMS communication service authorization check for the session by using the information of the IMS communication service identifier currently stored by the storage module.

In some embodiments, the HSS sends the locally stored information of the user subscribed IMS communication service identifier to the SID-requiring network entity upon sensing the arrival of the information related to the user subscribed IMS communication service identifier. Thus, the SID-requiring network entity acquires the IMS communication service identifier.

Further, the S-CSCF acts as the SID-requiring network entity. After acquiring the IMS communication service identifier, the S-CSCF performs the IMS communication service authorization check for a session during set-up of the session, thereby precisely ensuring legality of the set-up of the session.

Further, the AS acts as the SID-requiring network entity. After acquiring the IMS communication service identifier, the AS may perform the application logic process dependent upon the IMS communication service identifier, which may include but is not limited to, checking the association relation between the application and the user subscribed IMS communication services, thereby ensuring legality of the implemented application.

Those skilled in the art can make various changes and variations to the disclosed examples without departing from the spirit and scope of the embodiments. The disclosed embodiments are intended to encompass these changes and variations provided they fall within the appended claims and equivalents thereof.

The invention claimed is:

1. A method for using an IP Multimedia Subsystem (IMS) communication service identifier, comprising:
   getting, by a home location register home subscriber service (HSS), arrival of information related to a user subscribed IMS communication service identifier; and
   sending, by the HSS, information of a user subscribed IMS communication service identifier to a Service Identifier (SID)-requiring network entity according to the information related to the user subscribed IMS communication service identifier;
   wherein the SID-requiring network entity is a Serving Call Session Control Function (S-CSCF);
   the HSS determines arrival of the information related to the user subscribed IMS communication service identifier upon reception of a message requesting for downloading a user service profile from the S-CSCF; and
   the HSS sends a response message of the message requesting for downloading the user service profile to the S-CSCF, wherein the information of the user subscribed IMS communication service identifier is contained in the response message.

2. A method for using an IP Multimedia Subsystem (IMS) communication service identifier, comprising:
   getting, by a home location register home subscriber service (HSS), arrival of information related to a user subscribed IMS communication service identifier; and
   sending, by the HSS, information of a user subscribed IMS communication service identifier to a Service Identifier (SID)-requiring network entity according to the information related to the user subscribed IMS communication service identifier;
   wherein the SID-requiring network entity is an application server;
   the HSS determines arrival of the information related to the user subscribed IMS communication service identifier upon reception of a message requesting for an inquiry from the application server; and
   the HSS sends a response message to the application server; wherein the information of the user subscribed IMS communication service identifier is contained in the response message.

3. A system for using an IP Multimedia Subsystem (IMS) communication service identifier, comprising:
   a home location register home subscriber service (HSS), configured to get arrival of information related to a user subscribed IMS communication service identifier and to send information of the user subscribed IMS communication service identifier to a Service Identifier (SID)-requiring network entity according to the information related to the user subscribed IMS communication service identifier; and
   the SID-requiring network entity is configured to receive the information of the IMS communication service identifier sent from the HSS;
   wherein the SID-requiring network entity is a Serving Call Session Control Function (S-CSCF);
   the S-CSCF sends to the HSS a message requesting for downloading a user service profile; and
   the HSS determines arrival of the information related to the user subscribed IMS communication service identifier upon reception of the message requesting for downloading the user service profile, sends a response message of the message requesting for downloading the user service profile to the S-CSCF, wherein the information of the user subscribed IMS communication service identifier is contained in the response message.

4. A serving call session control function entity, comprising:
- a receiving module configured to receive information of an IP Multimedia Subsystem (IMS) communication service identifier sent from a network side;
- a storage module configured to store the information of the IMS communication service identifier; and
- an updating module configured to update data stored by the storage module using the information of the IMS communication service identifier received by the receiving module;
- further comprising an authorization checking module configured to perform an IMS communication service authorization check for a session using the information of the IMS communication service identifier currently stored by the storage module during setting up the session.

* * * * *